(12) United States Patent
Kim

(10) Patent No.: US 10,706,054 B2
(45) Date of Patent: Jul. 7, 2020

(54) METHOD AND DEVICE FOR SEARCHING INDEXES FOR SENSOR TAG DATA

(71) Applicant: Machbase, Inc., Seoul (KR)

(72) Inventor: Sung Jin Kim, Seoul (KR)

(73) Assignee: Machbase, Inc., Seoul (KR)

(*) Notice: Subject to any disclaimer, the term of this patent is extended or adjusted under 35 U.S.C. 154(b) by 0 days.

(21) Appl. No.: 16/109,344

(22) Filed: Aug. 22, 2018

(65) Prior Publication Data

US 2020/0057818 A1 Feb. 20, 2020

(30) Foreign Application Priority Data

Aug. 17, 2018 (KR) .................. 10-2018-0095950

(51) Int. Cl.
| | | |
|---|---|---|
| *G06F 11/00* | (2006.01) | |
| *G06F 16/2455* | (2019.01) | |
| *G06F 11/14* | (2006.01) | |
| *G06F 16/22* | (2019.01) | |

(52) U.S. Cl.
CPC .... *G06F 16/24553* (2019.01); *G06F 11/1438* (2013.01); *G06F 16/221* (2019.01); *G06F 16/2228* (2019.01); *G06F 2201/805* (2013.01); *G06F 2201/82* (2013.01)

(58) Field of Classification Search
CPC ...... G06F 16/2228; G06F 16/13; G06F 16/22; G06F 2212/1044; G06F 3/0604; G06F 3/0626; G06F 3/0644
See application file for complete search history.

(56) References Cited

U.S. PATENT DOCUMENTS

| | | | | |
|---|---|---|---|---|
| 7,702,628 B1* | 4/2010 | Luchangco | ......... | G06F 16/9014 |
| | | | | 707/999.006 |
| 8,290,977 B2* | 10/2012 | Chinchwadkar | ...... | G06F 16/835 |
| | | | | 707/778 |
| 8,965,849 B1* | 2/2015 | Goo | .................... | G06F 16/2246 |
| | | | | 707/634 |
| 9,589,008 B2* | 3/2017 | Colgrove | .............. | G06F 12/121 |
| 10,146,814 B1* | 12/2018 | Gupta | ................. | G06F 16/2228 |
| 10,484,365 B2* | 11/2019 | Wu | ..................... | H04L 63/0838 |
| 2003/0158854 A1* | 8/2003 | Yoshida | ................ | G06F 16/258 |

(Continued)

FOREIGN PATENT DOCUMENTS

| KR | 10-0687616 B1 | 2/2007 |
|---|---|---|
| KR | 10-1656077 B1 | 9/2016 |

(Continued)

*Primary Examiner* — Loan L. T. Truong
(74) *Attorney, Agent, or Firm* — Studebaker & Brackett PC

(57) ABSTRACT

An embodiment of the invention provides a device for searching indexes for sensor tag data. The can include a memory that has sensor tag data stored as a time series; an interface that is configured to receive tag names and time segment information for searching sensor tag data; and a processor that is configured to determine partitions of the memory having the sensor tag data stored therein based on the time segment information and configured to determine corresponding indexes and leaf nodes for the determined partitions based on the tag names and the time segment information. An embodiment of the invention can provide an optimized index structure for and a method of storing and searching time series sensor tag data with which most query patterns relating to time series sensor tag data can be satisfied.

7 Claims, 3 Drawing Sheets

(56) References Cited

U.S. PATENT DOCUMENTS

| | | | |
|---|---|---|---|
| 2005/0234842 A1* | 10/2005 | Lau | G06F 16/2343 |
| 2007/0174695 A1* | 7/2007 | Varadarajan | G06F 11/1458 714/15 |
| 2010/0106695 A1* | 4/2010 | Calder | G06F 16/2255 707/696 |
| 2011/0145204 A1* | 6/2011 | Maple | G06F 11/2028 707/682 |
| 2012/0078843 A1* | 3/2012 | Mehrotra | G06F 16/2272 707/640 |
| 2012/0330954 A1* | 12/2012 | Sivasubramanian | H04L 67/02 707/737 |
| 2013/0054642 A1* | 2/2013 | Morin | G06F 16/24544 707/770 |
| 2013/0138629 A1* | 5/2013 | Rehmattullah | G06F 16/81 707/715 |
| 2014/0279855 A1* | 9/2014 | Tan | G06F 16/2228 707/609 |
| 2015/0120749 A1* | 4/2015 | Phanishayee | G11B 27/034 707/741 |
| 2016/0062852 A1* | 3/2016 | Maple | G06F 11/2028 714/19 |
| 2017/0132291 A1* | 5/2017 | Liu | G06F 7/08 |
| 2018/0285494 A1* | 10/2018 | Taylor | G06F 30/20 |
| 2018/0341271 A1* | 11/2018 | Blayvas | G05D 1/0246 |
| 2018/0349095 A1* | 12/2018 | Wu | G06F 3/061 |
| 2019/0012852 A1* | 1/2019 | Dai | G07C 5/0808 |
| 2019/0102263 A1* | 4/2019 | Singh | G06F 11/1469 |
| 2019/0129972 A1* | 5/2019 | Borate | G06F 16/2329 |
| 2019/0272925 A1* | 9/2019 | Barrett | G16H 50/30 |
| 2020/0042538 A1* | 2/2020 | Stewart | G06F 16/278 |

FOREIGN PATENT DOCUMENTS

| | | |
|---|---|---|
| KR | 10-1744892 B1 | 6/2017 |
| KR | 10-2018-0008774 A | 1/2018 |

* cited by examiner

METHOD AND DEVICE FOR SEARCHING INDEXES FOR SENSOR TAG DATA

This work was supported by Seoul Metropolitan City funded by the Korean Government (CI160021).

CROSS-REFERENCE TO RELATED APPLICATIONS

This application claims the benefit of Korean Patent Application No. 10-2018-0095950, filed with the Korean Intellectual Property Office on Aug. 17, 2018, the disclosure of which is incorporated herein by reference in its entirety.

BACKGROUND

1. Technical Field

The present invention relates to a method and device for searching indexes for sensor tag data. More particularly, the invention relates to a method and device for enabling high-speed inputting and indexing for sensor tag data.

2. Description of the Related Art

Time series sensor data inherently involves generating large quantities of data at high speeds. An important issue with processing sensor data is to visualize the data via statistical computations and analyzing the results. There is the problem, however, that real-time searching and performing statistical computations for the purpose of visualizing data for a certain period, which may range from a few minutes in some cases to several years in others, is virtually impossible even with powerful big data processing systems.

Regarding the issue of visualizing sensor data from a data perspective, what is required involves searching several million pieces of data associated with a particular sensor from among several hundred billion pieces of data and then sorting the data in order of time. To this sorted data, computations for obtaining the average of the data, etc., are performed to find the representative value for each unit time segment, and the results are visualized. Here, a large amount of disk I/O may occur for indexing to enable searches, and a large amount of CPU computations may occur for the sorting and obtaining representative values.

As regards the visualizing of sensor data, sensor tag data has the characteristic that large amounts of data are generated at very high speeds. Therefore, there is a need for efficiently storing, compressing, and searching such sensor tag data.

However, with existing technology, there is the problem that, since the data on sensor values does not exist in a continuous space, a considerable amount of disk I/O may occur for a sensor data query, even when indexes are used, leading to degraded performance Thus, there is a need for a method of storing such sensor value data in a continuous space by way of a particular processing of the data and efficiently indexing and searching the sensor tag data.

SUMMARY OF THE INVENTION

An aspect of the invention, conceived to resolve the problems described above, provides an optimized index structure for time series sensor tag data as well as a method of storing and searching such data.

Also, an aspect of the invention provides a method and device that enable high-speed data input and indexing for sensor tag data, for reducing the enormous computation costs associated with processing sensor tag data.

An embodiment of the present invention provides a device for searching indexes for sensor tag data. The device can include a memory that has sensor tag data stored as a time series; an interface that is configured to receive tag names and time segment information for searching sensor tag data; and a processor that is configured to determine partitions of the memory having the sensor tag data stored therein based on the time segment information and configured to determine corresponding indexes and leaf nodes for the determined partitions based on the tag names and the time segment information. An embodiment of the invention can provide an optimized index structure for and a method of storing and searching time series sensor tag data with which most query patterns relating to time series sensor tag data can be satisfied.

In one embodiment, the data stored in the memory can be stored as records consisting of <time, tag name, value>, and the records can be stored for each partition until the number of stored records reaches the maximum count, and an index can be generated for a partition for which storage is completed with a key in the form of <tag name, time>, and the fields <value, RID> can be recorded in a data region of the index.

In one embodiment, an additional data column of the record can be stored in the memory such that the additional data column is readable using the RID of the index at a column data file. Here, a particular time value of a particular tag name can be readable at the leaf node of the corresponding index.

In one embodiment, when partition index files configured for the partitions are generated to a particular number, the processor can merge the partition index files to generate a larger index file, and the processor can repeat the merging to generate one index file for one hundred million or more pieces of data. Here, when generating a second index file of a subsequent level from a partitioned first index file generated in a previous level is completed, then the processor can record the completed status of the second index file in a head region and a tail region of the second index file and delete the first index file.

In one embodiment, the merging can include a primary merging and a secondary merging, and the blocks before the primary merging can be configured as a records having the fields <Tag, Time, Value>. Here, the blocks after the primary merging performed by the processor can be configured to have the fields <Tag, Count, Time, Value, Row ID>, and the blocks after the secondary merging performed by the processor can be configured to have the fields <Tag & Meta, Time, Value, Row ID>. Here, the "Tag & Meta" field can be configured to include fields of Tag, Offset, and Count and metafiles of Time, Value, and Row ID. Accordingly, the metafiles of Time, Value, and Row ID can each have the subfields of Min, Max, Original Size, Compressed Size, Page, and Offset.

In one embodiment, the processor can read a column data file by obtaining a value of the leaf node and the RID.

In one embodiment, the processor can perform a fault recovery algorithm to restart the device in the event of an abnormal termination caused by an abnormal operation of the hardware and software of the device.

In one embodiment, the processor can determine whether or not an error due to an abnormal operation during the merging of index files occurred, based on the completed status in the head region and tail region of the index file. Here, if such an error occurred, the processor can delete the index file and perform a record search by using the first index files of a level before the merging.

In one embodiment, the processor can verify whether or not an IO (input/output) error has occurred in units of pages with respect to a data file for which the index file has not been generated. Here, the processor can process records of which a recording has not been completed in the data file by way of a rollback.

At least one embodiment of the invention can provide an optimized index structure and storing and searching method for time series sensor tag data that can satisfy most query patterns.

Also, at least one embodiment of the invention offers the advantage of reducing the enormous computational costs associated with processing sensor tag data by providing a method and device for enabling high-speed data input and indexing of sensor tag data.

Additional aspects and advantages of the present invention will be set forth in part in the description which follows, and in part will be obvious from the description, or may be learned by practice of the invention.

BRIEF DESCRIPTION OF THE DRAWINGS

A brief description of each drawing is provided below to allow a better understanding of the drawings referred to in the detailed description of the invention.

DETAILED DESCRIPTION OF THE INVENTION

Figure 1:
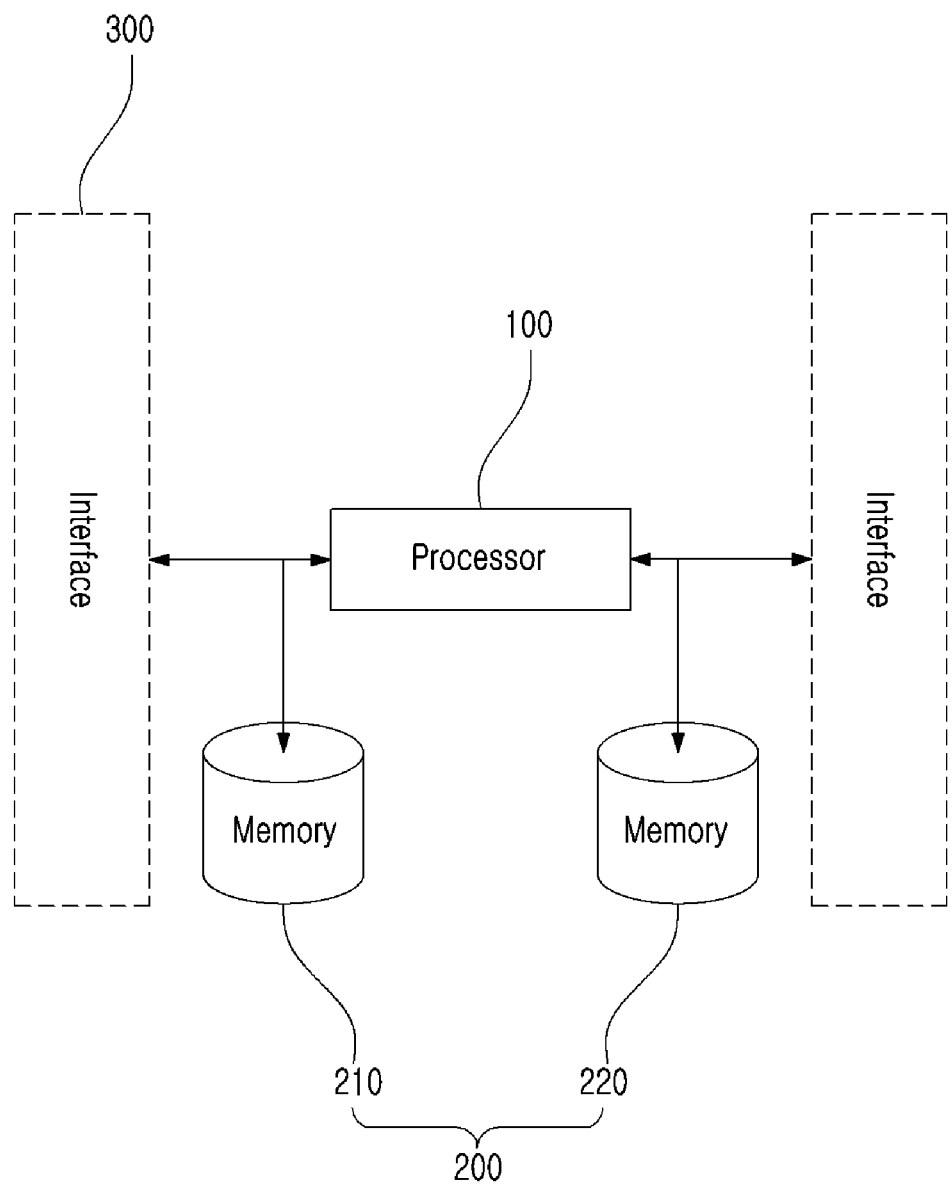
FIG. 1 illustrates the composition of a device for searching indexes for sensor tag data according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In describing the invention, detailed explanations of the related known art are omitted if it is deemed that such explanations may unnecessarily obscure the essence of the invention. Also, ordinal numbers (e.g. first, second, etc.) used in the descriptions of the present specification are merely intended as identification to differentiate one component from another component.

In the present specification, when reference is made to one component being "connected" or "joined", etc., to another component, it should be appreciated that, while the one component and the other component can be directly connected or directly joined together, the components can be connected or joined by way of one or more other components interposed therebetween, unless there is specific statements to the contrary.

Terms such as "module" and "part" for certain components used in the descriptions below have been added and are interchangeable solely for the sake of convenience in drafting the specification, and the terms themselves do not have distinguishable meanings or functions. Also, for a clearer description of the invention, portions that are of no relevance have been omitted in the drawings, and the same reference numerals have been made to refer to the same components throughout the specification.

A description is provided below of a device for searching indexes for sensor tag data according to an embodiment of the invention.

In the context of an embodiment of the invention, sensor tag data is characterized by large amounts of data being generated at very high speeds. The present invention relates to methods of storing, compressing, and searching such sensor tag data with greater efficiency.

The sensor tag data may be data having the form of a record that includes columns, such as <Time, TagName, Value, additional option columns>. Such sensor tag data can be searched by using TagName and time condition clauses as shown below. A search relating to the value and additional option columns can be executed with a full scan.

SELECT tagname, time, value from tag where tagname in ('a', 'b', 'c') and time between FromTime and ToTime order by 1, 2;

Queries such as the above take up the vast majority of queries for sensor tag data.

Below, a more detailed description of how an embodiment of the invention may be practiced is provided, with reference to the accompanying drawings.

FIG. 1 illustrates the composition of a device for searching indexes for sensor tag data according to an embodiment of the invention.

Referring to FIG. 1, a device for searching indexes for sensor tag data may include a processor 100, a memory 200, and an interface 300. The memory 200 in turn can include a first memory 210 and a second memory 220. Here, the first memory 210 and the second memory 220 can refer to areas of memory where raw data and index data are stored, respectively. Alternatively, the first memory 210 and the second memory 220 can refer to areas of memory where data prior to merging and data subsequent to merging are stored.

Accordingly, the first memory 210 can be configured to store sensor tag data. Also, sensor tag data in the form of indexes or sensor tag data in the form of merged indexes can be stored in the second memory 220 as a time series.

The interface 300 may be configured to receive tag name and time segment information used for searching sensor tag data.

In relation to the above, the procedures for high-speed data input and storage according to an embodiment of the invention are considered as follows.

To remove the load for data input and index generation, inputted data may be stored in the form of a record of <time, tagname, value>, with additional columns stored separately according to column. The records may be simply stored until the number of inputted records reaches the partition's maximum count, and since there are no indexes at this point, a search for such data may involve a full data scan rather than an index search.

The detailed operations associated with the column-wise data storage and data scan according to partition may be described as follows from the perspective of the processor 100.

The processor 100 may be configured to determine partitions for the memory in which the sensor tag data is stored based on the time segment information. Also, the processor 100 may be configured to determine the corresponding indexes and leaf nodes for the determined partitions based on the tag names and the time segment information. A description is provided below of the procedures for index generation and data compression according to an embodiment of the invention.

A partition for which input is completed may have an index generated, with <tagname, time> as a key, and in the data region of the index, <value, RID> may be recorded. When the generation of the index is completed, the previously generated partition data file may be deleted. The additional data columns can be read at the column data file by using the RID of the index, and a particular time value of a particular tagname can be read directly at the leaf node of the index. The result values configured as value/RID may be recorded within the index files sorted with respect to the tagname, time columns.

The partition index files thus generated, when a particular number is generated, may be merged to create a larger index, and this may be repeated several times so that ultimately one hundred million pieces of data are represented by one index file.

When the generating of an index file of a subsequent level from the partitioned index files generated in a previous level is completed, the completed status may be recorded in the head region and tail region of the index file, and the indexes of the previous level may be deleted.

The value/RID recorded in the leaf node of the index may be recorded by way of real-time compression when being recorded on a disk and may be read by way of decompression when being read. Ultimately, the index file may be generated in the form illustrated below.

| tagname | time  | value/rid |
|---------|-------|-----------|
| tag001  | 00:00 | 20/0      |
|         | 00:01 | 21/2      |
|         | 00:02 | 22/4      |
|         | 00:03 | 21/6      |
| tag002  | 00:01 | 80/1      |
|         | 00:02 | 80/3      |
|         | 00:03 | 81/5      |
|         | 00:04 | 81/7      |

Here, the sensor tag data may be stored sorted in order of tagname-time.

Figure 2:
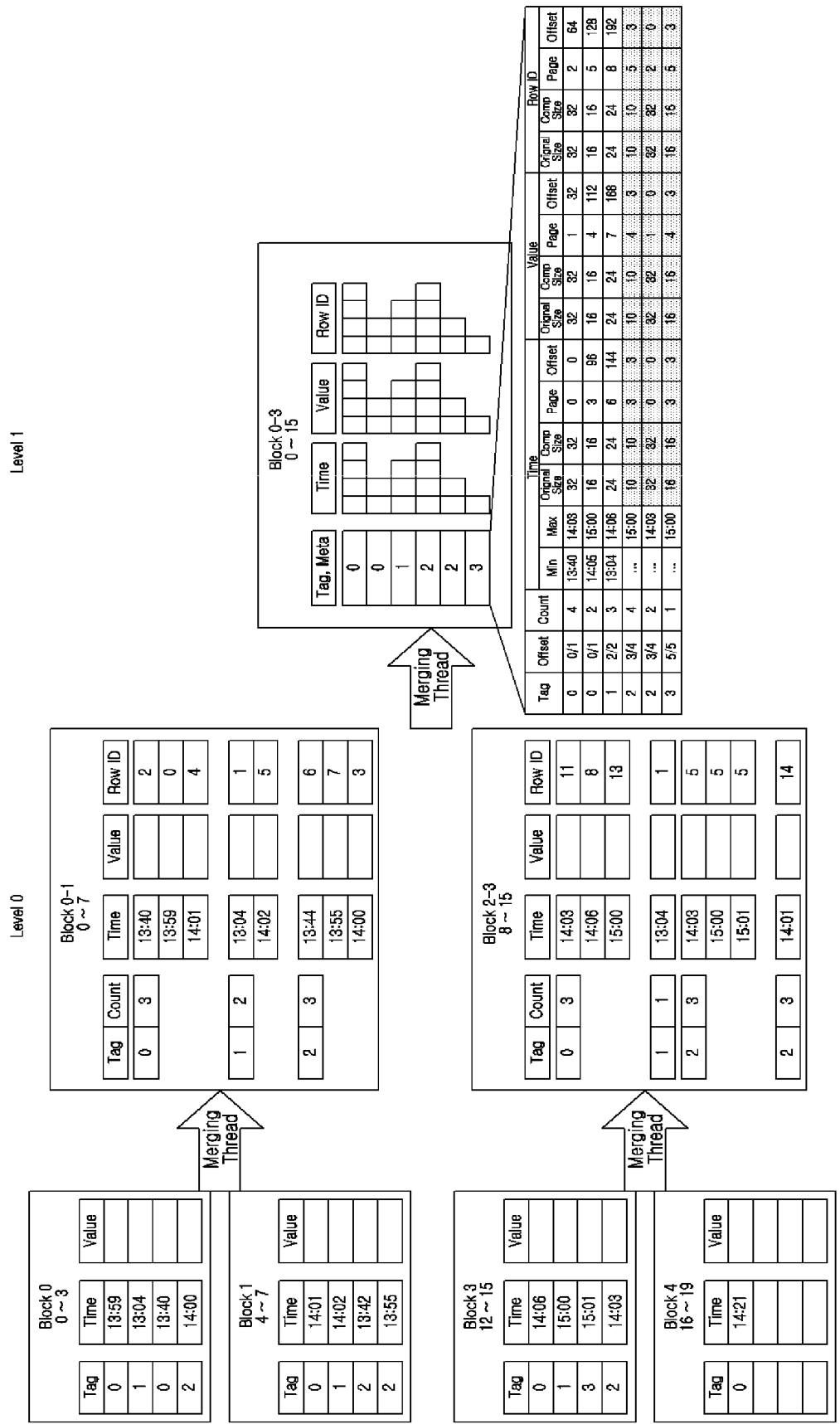
FIG. 2 is a conceptual diagram illustrating procedures for merging tag index data according to an embodiment of the invention.

FIG. 2 is a conceptual diagram illustrating procedures for merging tag index data according to an embodiment of the invention. Referring to FIG. 2, an example of merging tag index data is as shown below. It is assumed that the data partition size at the initial level is 4. The tag names are substituted with numbers and shown in the tag column.

FIG. 2 shows how multiple blocks configured with multiple records having the fields <Tag, Time, Value> may be merged together. For example, Block 0 and Block 1 from before the merging may be merged together to form Block 0-1, while Block 2 and Block 3 may be merged to form Block 2-3. The merged Block 0-1 and Block 2-3 may be configured to have the fields <Tag, Count, Time, Value, Row ID>. Here, the "count" field represents the number of records having the same tag. For example, for Block 0 and Block 1 from before the merging, the numbers of records of which the tag ID is 0 are two and one, respectively. Accordingly, from the value of the "count" field, it can be seen that the merged Block 0-1 has three records of which the tag ID is 0. The "Row ID" represents the order of the records arranged according to tag ID. For example, the "Row ID" for the records of Block 0 prior to merging may be assigned 0 to 3 in sequential order. Also, the "Row ID" for the records of Block 1 prior to merging may be assigned 4 to 7 in sequential order. For Block 0-1 after the merging, the records of which the tag ID is 0 correspond to row 0 and 2 in Block 0 (records 0 and 2) and to row 0 in Block 1 (record 4). Thus, the "Row ID" for the records having a tag ID of 0 in Block 0-1 after the merging correspond to 0, 2, and 4.

Block 0-1 and Block 2-3, which have undergone a primary merging, may be merged to generate Block 0-3 via a secondary merging. Here, the secondarily merged block may be configured to have the fields <Tag & Meta, Time, Value, Row ID>. Here, the "Tag & Meta" field may be composed of fields including Tag, Offset, and Count, and metafiles including Time, Value, and Row ID. Here, the metafiles Time, Value, and Row ID may each have the sub-fields Min, Max, Original Size, Compressed Size, Page, and Offset. By repeating the merging steps in a leveled manner, including a primary merging process and a secondary merging process, there is the advantage that it is possible to generate one index file for a hundred million or more pieces of data. Also, when generating a second index file of a subsequent level from the partitioned first index files of a previous level is completed, then the completed status of the second index file may be recorded in the head region and tail region of the second index file, and there is the advantage that the first index files can be deleted.

In relation to the tag data sorted in order of tagname-time, a description is provided below of the index generation and data compression processes according to an embodiment of the invention, as considered from the perspective of storage structure in the memory 200 and operation of the processor 100.

The data stored in the memory 200 may be stored as records configured as <time, tag name, value>, which may be stored for each partition until the number of stored records reaches the maximum count. Here, for a partition for which the storage is completed, an index can be generated with <tag name, time> as a key, and <value, RID> can be recorded in the data region of the index.

The records can be stored in the memory 200 such that the additional data columns of the records can be read from the column data file by using the RID of the index. Here, the structure can be set up such that a particular time value of a particular tag name can be read from the leaf node of the corresponding index.

The processor 100 can perform merging steps of the index files to generate a leveled index structure. Alternatively, the processor 100 can perform merging steps for the index files to generate an index structure of larger index sizes.

In relation to the above, when the partition index files configured for the partitions are generated to a particular number, the processor 100 can merge the index files to generate a larger index file. Accordingly, the processor 100 can repeat the merging step to generate one index file for one hundred million or more pieces of data.

Here, when the generating of a second index file of a subsequent level from the partitioned first index files generated in a previous level is completed, the processor 100 can perform the following operations. That is, the processor 100 can record the completed status of the second index file in the head region and tail region of the second index file and can delete the first index files.

More specifically, the processor 100 can perform a merging step that includes a primary merging step and a secondary merging step. Here, the multiple number of blocks prior to the primary merging step may be configured as multiple records having the fields <Tag, Time, Value>. The blocks after the primary merging step performed by the processor 100 may be configured to have the fields <Tag, Count, Time, Value, Row ID>. Also, the blocks subsequent to the secondary merging step performed by the processor 100 may be configured to have the fields <Tag & Meta, Time, Value, Row ID>. Here, the "Tag & Meta" field may include a Tag, Offset, and Count field, as well as a Time, Value, and Row ID metafile. In relation to the above, the metafiles of Time, Value, and Row ID can each be configured to include Min, Max, Original Size, Compressed Size, Page, and Offset subfields.

The processor 100 can read the column data files by obtaining the value and the RID of the leaf node.

Below, a description is provided of a fault recovery procedure for sensor tag data indexed according to an embodiment of the invention.

A fault recovery algorithm for restarting service without any problems, in the event of an abnormal termination caused by a hardware (HW) and software (SW) malfunction may proceed according to the following.

1. For data that has already completed a merging and no longer includes newly recorded data, there is no fault recovery needed. This is because the data is sensor data, for which there are no data updates, and the operating system supports the permanence of the files.

2. If an error has occurred during the merging of indexes, which can be verified by reading the completed statuses in the head/tail of the index file, then the index file may be deleted, and the files of a level before the merging may be used for the search. If the merging of the indexes was not completed, then the index files targeted for merging have not yet been deleted, and a search can be performed without any problems, since the index files targeted for merging themselves were merged from the index files of a lower level.

3. In the case of data files for which indexes have not been generated, IO errors may be checked in units of pages, and records for which the recording have not been completed may be processed with a rollback.

The error/fault recovery process described above may be considered from the perspective of operations by the processor 100 as follows.

In relation to the above, the processor 100 can perform a fault recovery algorithm to restart the device, in the event of an abnormal termination caused by an abnormal operation in the hardware and software of the device. In relation to the above, the processor 100 may not perform a fault recovery operation for sensor data, concerning which there are no data updates due to the fact that there are no new data recorded after a merging of index files has been completed.

Based on the completed status of the head region and tail region of the index files, the processor 100 can determine whether or not an error has occurred due to an abnormal operation during the merging of index files. Here, if such an error has occurred, then the processor 100 can delete the index file and perform a record search by using the first index files from before the merging.

In the case of data files for which index files were not generated, the processor 100 can verify whether or not an IO (input/output) error has occurred for each page. Here, records for which the recording has not been completed in the data files can be processed with a rollback.

Next, a more detailed description is provided of a method of searching indexes for sensor tag data according to an embodiment of the invention.

Since time series sensor tag data is almost always searched with the condition of tagname-time, the data may be read by browsing the index structure above in the order of tagname-time. Here, since the data is recorded in a continuous disk space for a single tagname and time, it is always possible to search data with minimal disk input/output.

Figure 3:
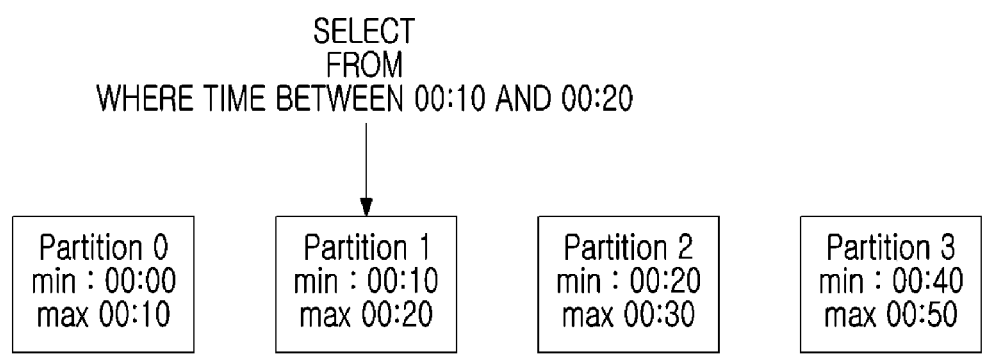
FIG. 3 illustrates the concept of choosing a corresponding partition by using a query and sensor tag data that has been indexed into a multiple number of partition structures according to time segments in an embodiment of the invention.

In relation to the above, FIG. 3 illustrates the concept of choosing a corresponding partition by using a query and sensor tag data that has been indexed into a multiple number of partition structures according to time segments in an embodiment of the invention.

Referring to FIG. 3, tag names can appear repetitively in several partitions. (With real-time input, sensor data occurs continuously with respect to time.) However, as regards time values, data is typically inputted sequentially from the past to the present. Therefore, if the minimum and maximum values of time for a partition are maintained in the memory, it is possible to forego reading several partitions based on the condition of input time. When merging indexes, the minimum and maximum values for the time values may be obtained and recorded in the partition header, and such information may be maintained.

When the partitions to be searched are chosen via the process above, the desired index and leaf node may be determined from the tagID and time values for each index partition, and the column data file may be read by obtaining the value of the leaf node and, if necessary, the RID.

The search method described may be considered from the perspective of the processor 100 and memory 200 as follows.

The data stored in the memory 200 may be stored as records configured as <time, tag name, value>, which may be stored in each partition until the number of stored records reaches the maximum count. Here, for a partition for which the storing is completed, an index may be generated with <tag name, time> as a key, while <value, RID> can be recorded in the data region of the index.

The records can be stored in the memory 200 such that the additional data columns of the records are readable at the column data file using the RID of the index. Here, a particular time value of a particular tag name can be read at the leaf node of the corresponding index.

The processor 100 may, based on the time segment information, determine the partitions of the memory in which the sensor tag data is stored. Also, the processor 100 may determine the indexes and leaf nodes based on tag names and time segment information for the partitions thus determined. Also, the processor 100 can obtain the values of the leaf nodes and the RID to read the column data files.

A method and device for searching indexes for sensor tag data according to certain embodiments of the invention have been set forth above.

At least one embodiment of the invention offers the advantage of providing an optimized index structure and a storing and searching method for time series sensor tag data that can satisfy most query patterns.

Also, at least one embodiment of the invention offers the advantage of reducing the enormous computational costs associated with processing sensor tag data by providing a method and device for enabling high-speed data input and indexing of sensor tag data.

The embodiments of the present invention disclosed above are intended, not to limit, but to describe the technical spirit of the invention. Thus, the scope of the technical spirit of the present invention is not limited by the embodiments above.

The scope of protection of the present invention is to be interpreted by the scope of claims below, and all technical concepts within the scope of equivalency are to be interpreted as being encompassed by the scope of the present invention.

What is claimed is:

1. A device for searching indexes for sensor tag data, the device comprising:
   a memory having sensor tag data stored as a time series;
   an interface configured to receive tag names and time segment information for searching sensor tag data; and
   a processor configured to determine partitions of the memory having the sensor tag data stored therein based on the time segment information, the processor configured to determine corresponding indexes and leaf nodes for the determined partitions based on the tag names and the time segment information,
   wherein data stored in the memory is stored as records consisting of <time, tag name, value>, the records are stored for each partition until a number of the stored records reaches a maximum count,
   an index is generated for the partition for which storage is completed with a key in a form of <tag name, time>, and fields <value, RID> are recorded in a data region of the index, and
   wherein, when partition index files configured for the partitions are generated to a particular number, the processor merges the partition index files to generate a larger index file, the processor repeats the merging to generate one index file for one hundred million or more pieces of data,
   and when generating a second index file of a subsequent level is completed from a partitioned first index file generated in a previous level, then the processor records a completed status of the second index file in a head region and a tail region of the second index file and deletes the first index file.

2. The device for searching indexes for sensor tag data according to claim 1, wherein an additional data column of the record is stored in the memory such that the additional data column is readable using the RID of the index at a column data file,
   and a particular time value of a particular tag name is readable at the leaf node of the corresponding index.

3. The device for searching indexes for sensor tag data according to claim 1, wherein the merging comprises a primary merging and a secondary merging,
   a plurality of blocks before the primary merging are configured as a plurality of records having fields <Tag, Time, Value>,
   blocks after the primary merging performed by the processor are configured to have fields <Tag, Count, Time, Value, Row ID>,
   blocks after the secondary merging performed by the processor are configured to have fields <Tag & Meta, Time, Value, Row ID>,
   the "Tag & Meta" field is configured to include fields of Tag, Offset, and Count and metafiles of Time, Value, and Row ID,
   and the metafiles of Time, Value, and Row ID each have subfields of Min, Max, Original Size, Compressed Size, Page, and Offset.

4. The device for searching indexes for sensor tag data according to claim 1, wherein the processor reads a column data file by obtaining a value of the leaf node and the RID.

5. The device for searching indexes for sensor tag data according to claim 1, wherein the processor performs a fault recovery algorithm to restart the device in an event of an abnormal termination caused by an abnormal operation of a hardware and software of the device,
   and the processor does not perform a fault recovery operation for sensor data for which a merging of the index files is complete such that data is no longer newly recorded and there are no data updates.

6. A device for searching indexes for sensor tag data, the device comprising:
   a memory having sensor tag data stored as a time series;
   an interface configured to receive tag names and time segment information for searching sensor tag data; and
   a processor configured to determine partitions of the memory having the sensor tag data stored therein based on the time segment information, the processor configured to determine corresponding indexes and leaf nodes for the determined partitions based on the tag names and the time segment information,
   wherein data stored in the memory is stored as records consisting of <time, tag name, value>, the records are stored for each partition until a number of the stored records reaches a maximum count,
   an index is generated for the partition for which storage is completed with a key in a form of <tag name, time>, and fields <value, RID> are recorded in a data region of the index,
   wherein the processor performs a fault recovery algorithm to restart the device in an event of an abnormal termination caused by an abnormal operation of a hardware and software of the device,
   and the processor does not perform a fault recovery operation for sensor data for which a merging of the index files is complete such that data is no longer newly recorded and there are no data updates, and
   wherein the processor determines whether or not an error due to an abnormal operation during a merging of the index files occurred based on a completed status of a head region and a tail region of the index file,
   and if the error occurred, the processor deletes the index file and performs a record search by using first index files of a level before the merging.

7. The device for searching indexes for sensor tag data according to claim 6, wherein the processor verifies whether or not an IO (input/output) error has occurred in units of pages with respect to a data file for which the index file has not been generated,
   and the processor processes records of which a recording has not been completed in the data file by way of a rollback.

* * * * *